US 6,670,960 B1

United States Patent
Evoy (10) Patent No.: US 6,670,960 B1
(45) Date of Patent: Dec. 30, 2003

(54) DATA TRANSFER BETWEEN RGB AND YCRCB COLOR SPACES FOR DCT INTERFACE

(75) Inventor: David R. Evoy, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 405 days.

(21) Appl. No.: 09/656,021

(22) Filed: Sep. 6, 2000

(51) Int. Cl.[7] .................................................. G09G 5/02
(52) U.S. Cl. ........................ 345/604; 345/564; 345/571
(58) Field of Search ................................ 345/604, 564, 345/571

(56) References Cited

U.S. PATENT DOCUMENTS

| | | | |
|---|---|---|---|
| 4,553,171 A | | 11/1985 | Holladay et al. |
| 5,311,211 A | * | 5/1994 | Simpson ..................... 345/571 |
| 5,581,733 A | | 12/1996 | Toda |
| 5,736,988 A | * | 4/1998 | Shaw et al. .................. 345/423 |
| 5,774,590 A | | 6/1998 | Tomisawa |
| 5,781,242 A | | 7/1998 | Kondo et al. |
| 5,784,050 A | * | 7/1998 | Corry ........................ 345/604 |
| 5,805,727 A | | 9/1998 | Nakano |
| 5,815,168 A | * | 9/1998 | May ........................... 345/572 |
| 5,867,598 A | | 2/1999 | de Queiroz |
| 5,875,039 A | | 2/1999 | Ohsawa et al. |
| 5,973,707 A | | 10/1999 | Mita |
| 5,982,396 A | | 11/1999 | Kim |
| 5,990,912 A | * | 11/1999 | Swanson .................... 345/568 |
| 6,028,612 A | | 2/2000 | Balakrishnan et al. |
| 6,157,743 A | * | 12/2000 | Goris et al. ................. 382/233 |
| 6,356,276 B1 | * | 3/2002 | Acharya ..................... 345/600 |
| 6,415,058 B2 | * | 7/2002 | Grohs et al. ................. 382/239 |

FOREIGN PATENT DOCUMENTS

| | | |
|---|---|---|
| GB | 2 345 400 | 7/2000 |
| WO | WO 99 13429 | 3/1999 |

* cited by examiner

Primary Examiner—Joseph Mancuso
Assistant Examiner—Po-Wei Chen
(74) Attorney, Agent, or Firm—Peter Zawilski (57) ABSTRACT

A method for transferring data between an RGB color space and a YCrCb color space useful for a DCT block-computation engine significantly increases throughput and decreases processor overhead. According to one example embodiment, a DMA function is optimized to fetch data from an external memory representing a RGB color space and to provide the data for a JPEG conversion while performing YCrCb color space conversion on the fly. More specifically, data is transferred from the RGB color space memory to a DCT block-computation engine adapted to process a YCrCb color space memory. The method includes providing the data for an RGB display screen area as a tile array having C columns and R rows of tiles, where one tile corresponds to sufficient RGB data for a DCT of at least one of a Cr data array and a Cb data array. Data is fetched at addresses in the tile array by accessing the data one tile at a time, and both the row within each tile and the tile within the tile array are tracked. The addresses are generated as a function of C, the tracked row and a tracked tile within the tile array. While the data is being fetched, the fetched data is used to fill buffers for the Y, Cr and Cb data arrays corresponding to the RGB display screen area. Another embodiment is directed to data transfer to the RGB color space memory from a DCT block-computation engine using, effectively, the reverse operation.

7 Claims, 10 Drawing Sheets

FOUR 8x8 Y ARRAYS, 1 Cr ARRAY, 1 Cb ARRAY
4*8*8+8*8+8*8=384 BYTES

FIG.3

RGB COLOR SPACE
ONE TILE

FOUR 8x8 Y ARRAYS, 3 COLORS EACH
4*8*8*3=768 BYTES

FIG.5

OVERALL IMAGE SCAN
FLOW OF THE TILES

A CLOSER LOOK
EACH SCAN LINE IS 16
PIXELS IN A TILE, FOLLOWED
BY THE NEXT 16 WORDS IN THE SAME TILE

EACH 16 PIXELS INCLUDES A RED, GREEN, AND A BLUE BYTE

DATA TRANSFER BETWEEN RGB AND YCRCB COLOR SPACES FOR DCT INTERFACE

FIELD OF THE INVENTION

This invention relates to video-data processing and, more particularly, to the conversion of video data between different formats.

BACKGROUND OF THE INVENTION

The electronics industry continues to rely upon advances in semiconductor technology to realize devices that achieve increasingly complex functions at ever-increasing speeds. For many video applications, realizing higher-functioning devices requires moving data quickly between different physical memory spaces and/or different color-representation formats. Depending on the process used for moving such data, the usefulness and overall operability of the device can be significantly enhanced or detrimentally impaired.

Video communications is an example application involving video-data processing having an efficiency rating that depends heavily on how video data is moved between remotely-located terminals. A typical example application would involve first and second remotely-located terminals attempting to communicate video data over a channel such as a POTS (plain old telephone service) or ISDN line using a channel interface/driver which is appropriate for the channel. At the first terminal, video data is collected from a source in a format convenient for displaying the data at the first terminal. The collected data is then compressed into a new format and is then transmitted in the compressed format to the second terminal. Before the video data is compressed, it is converted to a format more adaptable for the compression. The second terminal then decompresses the data into another format convenient for its designated use. The efficiency rating for this type of video-data processing would therefore depend heavily on how the video data is handled as it is converted between formats and moved between remotely-located terminals.

Video-data processing applications have improved efficiency ratings using various approaches, some with particular emphasis on the video data compression formatting. A common compression format for video applications is JPEG, which generally uses a YCrCb (luma, chroma red and chroma blue) representation of the color space. However, computers typically display data using a RGB (Red, Green, Blue) color space. The RGB color space is an advantageous color space for display because commodity displays, such as LCDs and CRTs, are controlled via RGB inputs. JPEG uses 8×8 blocks to compress colors. JPEG compression often involves changing from a flat frame buffer in RGB to YCrCb prior to compression. JPEG decompression normally involves changing the YCrCb output from JPEG to the RGB color space for display purposes.

Previous attempts to increase the efficiency rating in JPEG applications have fallen short of keeping up with some of the high-speed applications required by recent systems. For example, such attempts have involved effective use and management of the busses interlinking the respective processors and the memory units, and the manner in which the processors retrieve each of the three RGB components in the flat frame buffer for respectively converting to each of the three YCrCb components. Other approaches for efficiently moving the data from a memory display buffer in RGB format to the DCT compression stage of a JPEG compression engine have involved use of a DMA with a full-line buffer for directly piping in the RGB components for conversion to each of the three YCrCb components. Each of these approaches has been relatively disadvantageous in the context of expense (as with the use of fill-line buffering with DMAs), power consumed, and/or the requisite bandwidth of the processor and memory.

SUMMARY

According to various aspects of the present invention, embodiments thereof are exemplified in the form of methods and arrangements concerning the transfer of data between an RGB color space and a YCrCb color space memory in a manner that applies to, among others, the above-discussed applications.

A more particular aspect of the present invention is directed to a specific application wherein the YCrCb color space memory is used for communication with a DCT block-computation engine. In connection with this embodiment and application, aspects of the present invention are directed to methods and arrangements for transferring data between an RGB color space memory to a DCT block-computation engine so as to significantly increase throughput and decrease processor overhead.

In a specific example embodiment, a DMA function is optimized to fetch data from an external memory representing a RGB color space and to provide the data for a JPEG conversion while performing YCrCb color space conversion on the fly. Data is transferred from the RGB color space memory to a DCT block-computation engine adapted to process a YCrCb color space memory. The method includes providing the data for an RGB display screen area as a tile array having C columns and R rows of tiles, where one tile corresponds to sufficient RGB data for a DCT of at least one of a Cr data array and a Cb data array. Data is fetched at addresses in the tile array by accessing the data one tile at a time, and both the row within each tile and the tile within the tile array are tracked. The addresses are generated as a function of C, the tracked row and a tracked tile within the tile array. While the data is being fetched, the fetched data is used to fill buffers for the Y, Cr and Cb data arrays corresponding to the RGB display screen area.

Another embodiment is directed specifically to data transfer to the RGB color space memory from a DCT block-computation engine using, effectively, the reverse operation.

In other more specific implementations, the present invention is directed to use of a processor arrangement programmed and configured to handle the above-described data manipulations and to compute one of the addresses as a function of: the number of tiles in the array multiplied by TN, plus a count of the tracked row multiplied by a count of C multiplied by a constant, where TN corresponds to the tracked tile number within the tile array.

In yet another more specific implementation, the processor arrangement is further programmed and configured to compute one of the addresses as a function of: the number of tiles in the array multiplied by TN, plus a count of the tracked row multiplied by a count of C multiplied by a constant, and also as a function of a count within a word segment of a tile. For instance, the tile may be implemented using 16-word segments.

The above summary is not intended to provide an overview of all aspects of the present invention. Other aspects of the present invention are exemplified and described in connection with the detailed description.

BRIEF DESCRIPTION OF THE DRAWINGS

Various aspects and advantages of the present invention will become apparent upon reading the following detailed description of various embodiments and upon reference to the drawings in which:

FIG. 10a is a diagram of an example circuit for a buffering approach of the 8×8 blocks for compression, in accordance with the present invention; and FIG. 10b is a diagram of an example flow diagram, in accordance with the present invention, depicting YCrCb data being written into various buffers in FIG. 10a.

While the invention is amenable to various modifications and alternative forms, specifics thereof have been shown by way of example in the drawings and will be described in detail. It should be understood, however, that the intention is not to limit the invention to any particular embodiment described. On the contrary, the intention invention is to cover all modifications, equivalents, and alternatives falling within the spirit and scope of the invention as defined by the appended claims.

DETAILED DESCRIPTION

The present invention has a variety of applications to video data processing and has been found to be particularly advantageous for use in connection with efficiently moving data between a RGB color space and a YCrCb color space memory, e.g., for presentation to a computation engine that is better adapted to process data in the YCrCb color space memory form. While the present invention is not necessarily limited to such applications, various aspects of the invention can be appreciated through a discussion of example embodiments implemented in this context.

According to one example embodiment, the present invention is directed to a data processing arrangement wherein data is moved between a RGB color space and a YCrCb color space memory that is coupled to a JPEG DCT compression. This embodiment may have different applications. For example, in one instance the data processing arrangement may be adapted to move data from the RGB color space to the YCrCb color space memory for coupling to the JPEG DCT compression, while in another instance the data processing arrangement may be adapted to move data from the JPEG DCT compression in the YCrCb color space memory form to the RGB color space for a display. Notwithstanding the application, the RGB color space data is arranged in an RGB display screen area as a tile array having C columns and R rows of tiles, where one tile corresponds to sufficient RGB data for a DCT of at least one of a Cr data array and a Cb data array. Data is transferred between the color space memories by fetching data from one of the color space memories and storing the fetched data at the other of the color space memories. The data is transferred as a function of C and as a function of accessing one tile at a time and tracking both the row within each tile and the tile within the tile array.

Consistent with the above embodiment, one particular application is directed to optimizing a DMA function adapted to fetch data from an external memory representing a RGB color space and to provide the data for a JPEG conversion while performing YCrCb color space conversion on the fly. The sequence passes four 8×8 blocks of red, green and blue source data in a single square tile that is 16 columns by 16 rows, which corresponds to the YCrCb color space having four 8×8 Y matrices, one 8×8 Cr matrix, and one 8×8 Cb matrix. The DMA operation (or overall sequencing) is optimized to read from memory only a single time in a sequence, which is optimal for SDRAM memory or another memory (or bus architecture) that favors linear burst fetches. The internal buffering is minimized by proceeding in an order that allows RGB to YCrCb color space conversion on the fly using, for example, simple 1024-byte buffers.

Figure 1:
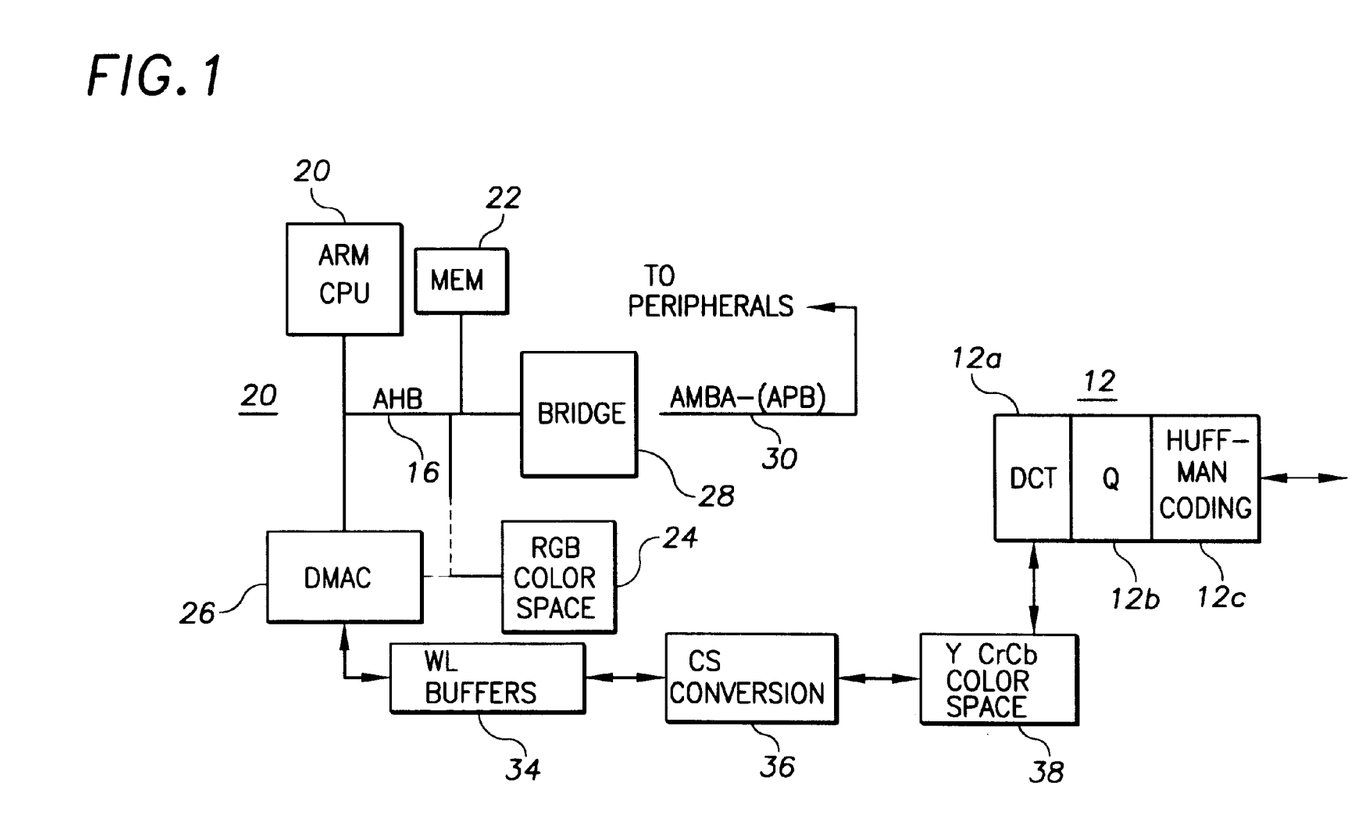
FIG. 1 is a block diagram of a video-processing arrangement, according to an example embodiment of the present invention.

Turning now to the figures and in accordance with the present invention, FIG. 1 illustrates a block diagram of a specific example embodiment of involving high-speed data transfer between an ARM-based data processing arrangement 10 and a DCT computation processor arrangement 12 including, for example, DCT, quantizer and Huffman coding ("encoding and/or decoding") blocks 12a, 12b and 12c, respectively. The ARM-based data processing arrangement 10 includes an AHB (Advanced High-performance Bus) 16 for communications between the ARM CPU 20 and system components including, for example, system memory (e.g., SDRAM) 22, RGB memory 24, and DMA controller (DMAC) 26. A bridge interface 28 is also connected to the bus 16 for communicatively coupling with various peripherals via an AMBA-APB (Advanced Microcontroller Bus Architecture—Advanced Peripheral Bus) 30. Although not necessarily required in all contemplated embodiments and applications, use of a high-speed bus, such as the AHB 16, is particularly useful in matching with the high throughput provided by the color conversion of the present invention. Other data high-performance bussing CPU arrangements that would benefit from implementations of the present invention include, without limitation, IBM's CoreConnect on-chip bus and Motorola's IP-bus.

The dashed lines extending from the RGB memory 24 to the AHB 16 and the DMAC 26 depict alternative data access (read and/or write) paths to the RGB memory 24; i.e., by the DMAC 26 over the AHB 16 or directly by the DMAC 26.

As mentioned above in connection with the previously-discussed embodiments, implementations of the present invention are not limited in converting between the RGB and YCrCb color spaces. As depicted for example by the bi-directional arrows and the Huffman encoding/decoding block, FIG. 1 contemplates conversion from the RGB color space to the YCrCb color space, conversion from the YCrCb color space to the RGB color space, or conversions in both directions. Such conversions are generally shown using three functionally-depicted blocks: word-line buffers 34, a color space conversion computation block 36, and a YCrCb color space 38. These functionally-depicted blocks (as well as other blocks shown in FIG. 1) can be implemented using any of various types of fully and/or partially programmable processors; many implementations, however, are better served using conventional ALU-type (adders, shifter and multiplier) logic in combination with various buffers.

A data processing arrangement such as described above is especially beneficial for video compression formats, such as JPEG, using a YCrCb representation of the color space. JPEG uses 8×8 blocks of colors in a YCrCb color space for processing by the DCT compression stage, whereas computers such as an ARM CPU (20 of FIG. 1) typically store display data using a RGB color space (e.g., memory 24 of FIG. 1). Where JPEG compression normally involves changing from RGB to YCrCb prior to compression, JPEG decompression involves changing the YCrCb output from JPEG to the RGB color space for storage and subsequent display purposes.

Data on a display screen is organized as columns and rows. For discussion purposes, an example display screen might have 480 column and 240 rows for a 480 by 240 display. Typical display refresh involves fetching the data continuously from the memory for presentation to the display driver and subsequent display on the computer screen. To organize this memory with operational efficiency, the data in memory is arranged starting with the first pixel on the screen to be refreshed, to the last pixel on the screen. Display refresh starts with row 0 column 0, display buffer address 0. The column number is then incremented, until row 0 column 479 is reached. Display refresh when continues with row 1, column 0 through column 479. This process is continued until the end of the display is reached, and then the process repeats. In a common alternative approach, both the upper and lower halves of the display are refreshed at the same time. In both cases, however, the display data is located in memory in a linear order.

Placing data in the memory in the same order allows the data to be efficiently removed from the DRAM device it is stored in. This follows because DRAM devices are more efficient in retrieving data that is located in the same page as the last data accessed. Most popular DRAMs today are also very order specific and deliver data most efficiently when the data is burst from the DRAM. The display data and DRAM storage techniques work well together in allowing for efficient access of the DRAM data.

With JPEG using 8-pixel by 8-pixel blocks to compress colors represented in a YCrCb color space, it is difficult to extract data efficiently from a DRAM which presents the data in the RGB color space. This difficulty is due to the Cr and Cb data having a subsampling correspondence to the RGB data. The data to be presented to the DCT block for the Y component of the RGB color space uses all the R, G and B data from an 8×8 image block, but the data to be presented to the DCT block for the Cr and Cb components of the RGB color space uses all the R, G and B data from a 16×16 image block. To minimize redundant accesses, it is desirable that the data is not fetched multiple times from the RGB color space memory; rather, that the data is fetched only once for a given DCT for efficient processing by hardware circuitry.

Figure 2A:
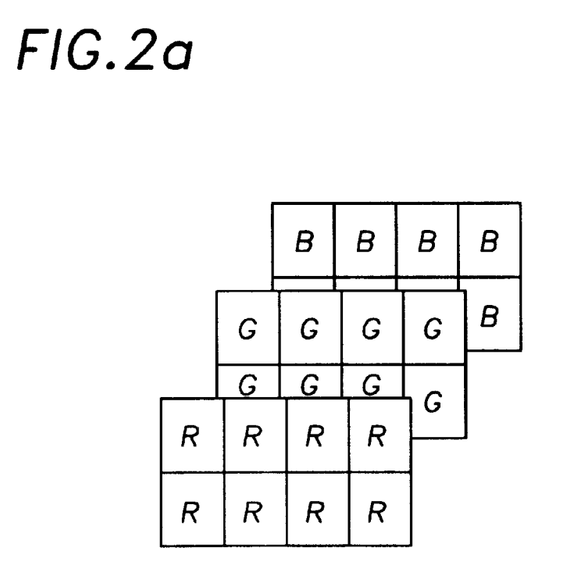
FIGS. 2a and 2b are respective diagrams of the RGB color space and the YCrCb color space format as known in the prior art.
Figure 2B:
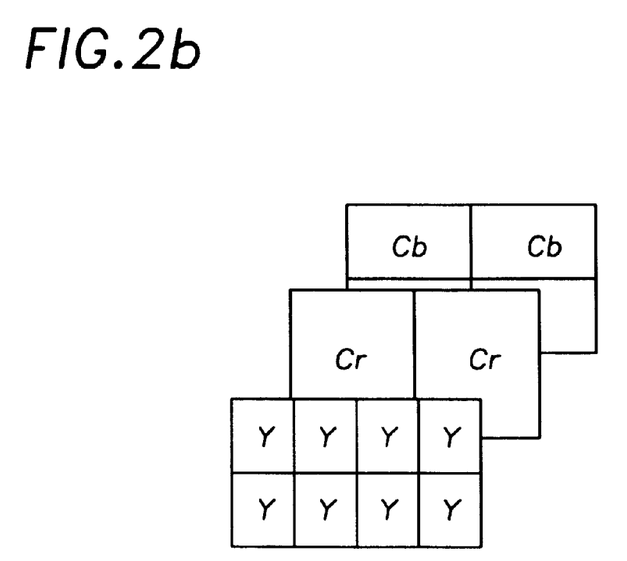

As depicted in the respective diagrams of FIGS. 2a and 2b, the RGB color space format of FIG. 2a depicts 8 locations on a screen that display color in RGB format. For each location on the screen, there is a red, a green, and a blue value. The YCrCb color space format of FIG. 2b depicts the YCrCb color space that is typically used with JPEG color image storage. The Y data on the left is the luminance comprised of 0.299R+0.587G+0.114B and is intended to be proportional to the response of human eyes to brightness. The diagram of FIG. 2a has a total of 24 values, and the diagram of FIG. 2b has 12 values. This difference is because the Cr and Cb data is subsampled; that is, for each set of values in RGB there is one Y value, and for each four sets of data in RGB there is one Cr and one Cb value. JPEG compresses 8×8 arrays of Y, Cr, and Cb data, uses a 8×8 block from memory for the Y data, and uses a 16×16 block compressed to an 8×8 block for each of the Cr and Cb data. The varying data size requirements for the different data types complicates the requirements to fetch this data from memory. It should also be noted that the Y data requires all three R G and B values to make the Y value, and the Cr and Cb data each need all three R G and B values from 4 locations (12 values in all), to make a single Cr or Cb value. It is advantageous for power and performance reasons not to require fetching this data from SDRAM multiple times.

Figure 3:
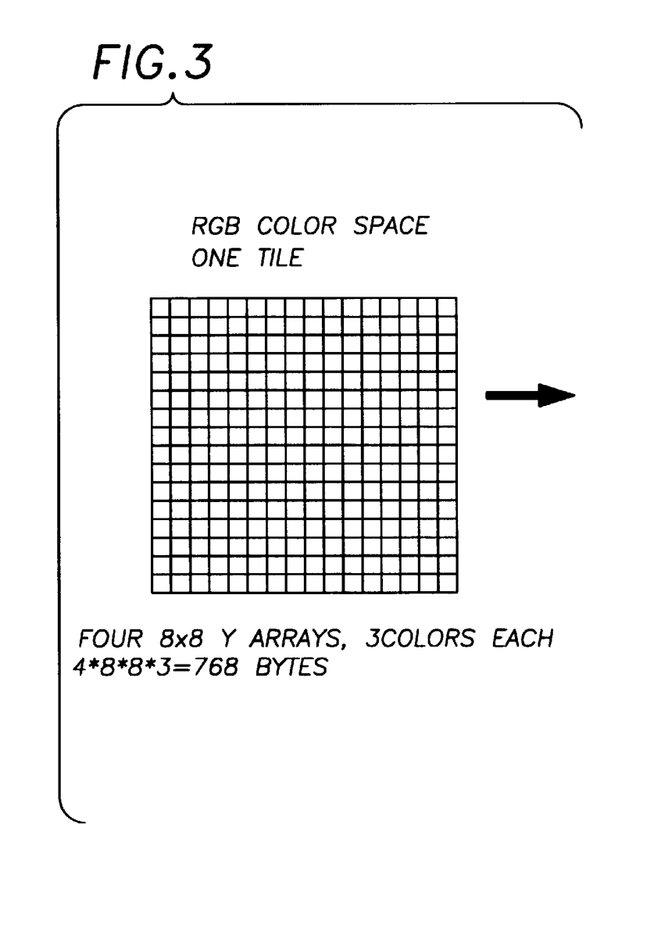
FIGS. 3 and 4 are diagrams of a tile conversion, according to an example embodiment of the present invention, depicting the conversion of four 8×8 arrays in RGB color space (FIG. 3) to four 8×8 Y arrays for DCT compression, one 8×8 Cr array, and one 8×8 Cb array (FIG. 4)
Figure 4:
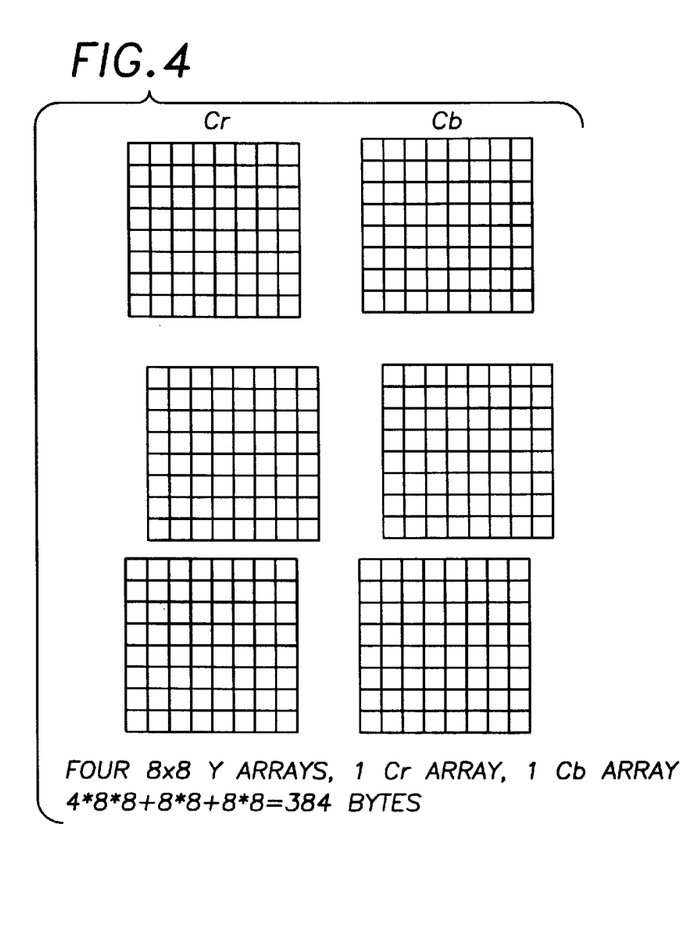

FIGS. 3 and 4 are respective diagrams of a "tile" conversion, according to an example embodiment of the present invention. FIG. 3 depicts four 8×8 arrays in RGB color space, and FIG. 4 depicts a group of four 8×8 Y arrays, one 8×8 Cr array, and one 8×8 Cb array. This group of six 8×8 arrays of FIG. 4 can be readily processed by a DCT computation engine, for example, for data compression. In this instance, the term "tile" refers to the 16 by 16 section of RGB values in display memory as shown in FIG. 3. Thus, a 16 by 16 section of RGB values in display memory (referred to as a tile in this example) is used to create four 8 by 8 Y arrays for DCT compression, one 8 by 8 Cr array and one 8 by 8 Cb array.

Figure 5:
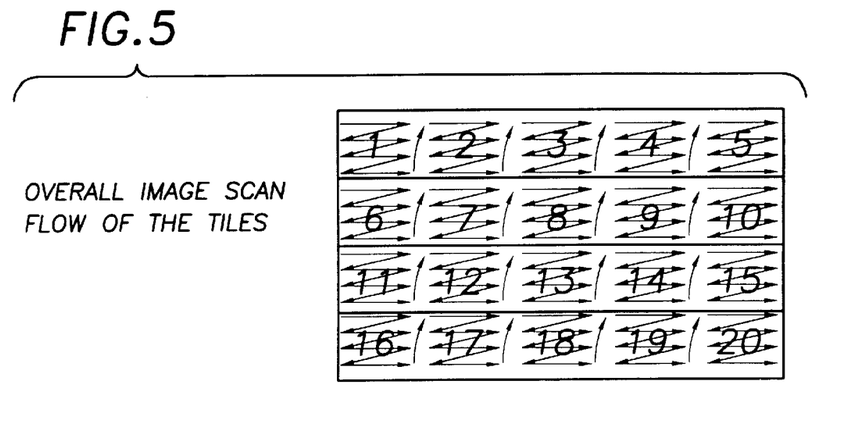
FIGS. 5, 6 and 7 respectively illustrate an image scan flow of tiles, according to an example embodiment of the present invention, at the tile array level (FIG. 5), the tile level (FIG. 6) and the scan line level (FIG. 7)
Figure 6:
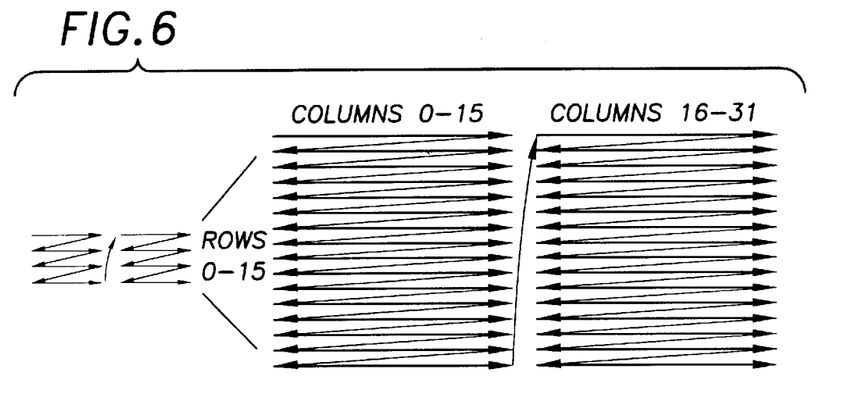
Figure 7:
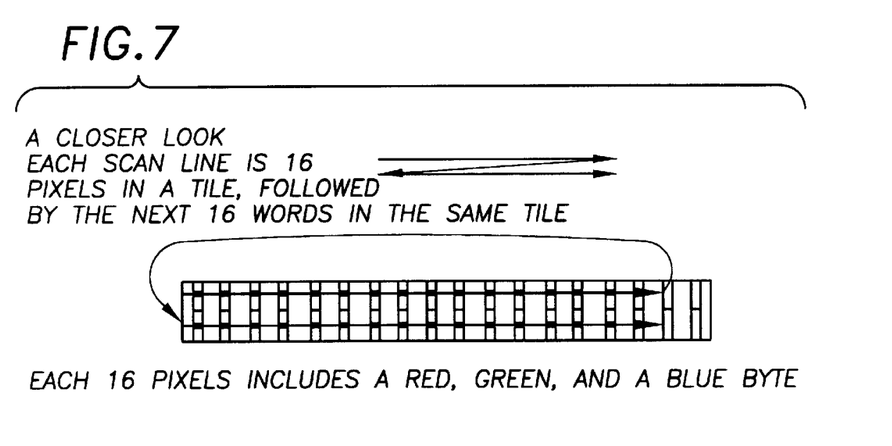

FIGS. 5, 6 and 7 respectively illustrate increasingly more detailed views of the manner in which data is scanned during a tile conversion, such as depicted in connection with FIGS. 3 and 4. Each tile, as well as the overall array of tiles, is scanned from left to right and top to bottom, with each individual tile being completely scanned before proceeding to the next tile. FIG. 5 illustrates a display screen with an overall image scan flow of an array of twenty tiles (five columns by four rows of tiles), according to an example embodiment of the present invention. FIG. 6 shows two of the tiles in FIG. 5, with each scan of a tile traversing a 16 by 16 section of pixels. FIG. 7 illustrates the scan path for two rows of 16 pixels in one of the above-illustrated tiles, with each pixel including data for the red, green and blue values. Each scan line is 16 pixels in a line, followed by the next 16 words in the same tile.

Accordingly, the scan path has been optimized to allow for: 1) data fetching from memory only once; 2) minimizing buffer requirements where a complete row buffer is not required; 3) data fetching from memory in a manner that is SDRAM friendly; and 4) RGB to YCrCb calculations being completed with minimum buffering and performed on the fly, therein further minimizing buffer requirements.

Also in accordance with the present invention, DMA addresses are generated as a function of the above relationship. For illustration purposes, one example implementation has data in RGB color space memory organized on 32 bit boundaries with 8 bits of each color: Red, [23:16], Green, [15:8], Blue, [7:0]. Further, this example implementation performs compression using corresponding data in a YCrCb color space, where each Y value corresponds to one RGB value, each Cr value corresponds to 4 RGB values, and each Cb value corresponds to 4 RGB values.

Using a DMAC controller (e.g., 26 of FIG. 1) to address the RGB color space memory (e.g., 24) for fetching the appropriate RGB data, a calculation is performed. For this implementation, a tile is the data in memory corresponding to the area on the screen that is used for data for a single DCT for the Cr or Cb data. Because the Cr and Cb data is subsampled, this same area also generates four 8×8 DCTs for Y data; hence, a single tile is used to generate data for six DCTs.

The calculation for determining correctly where to address the memory is based on various functions. These functions include: various counters and "NCol," where NCol is equal to the number of tile columns. In the example tile array of FIG. 5, the number of columns is 5. The address is calculated by using the following counters:

WC=Word count. The WC counter is 4-bits wide, counting within a 16 word segment (0–15) of a tile, and is incremented every time a word is transferred.

RC =Row count. The RC counter is used to count vertically through a tile. In this example application, the RC counter is a 4 bit counter, counting fromo 0 to 15, and is incremented every time the WC counter overflows.

TVCT=Tile total count. The TVCT counter resets at the start of each image conversion, and increments each time the RC counter overflows. This counter is set at a length adequate to hold the count of the total number of tiles in any design.

For various applications, the WC parameter is not practicably used, for example, where the bus can guarantee that 16 word bursts are always supported.

The correct address is then determined from the following computation:

Address=TVCT*1024+RC*16*NCol+WC

Moving the data from the display to the compression unit requires no more than the above calculation. Because the address at the end of any row may cause a major change in the address in memory, full adders are typically used. The total tile count (TVCT) multiply is readily implemented using conventional shifting logic, whereas the NCol computation involves a more complete multiply, or shift/add operation. In one example embodiment the NCol computation is implemented as a simple integer multiply operation. The RC and WC can be further divided to create an optimal flow from the RGB to YCrCb generation, as the skilled artisan will recognize from this discussion.

In various embodiments, the NCol multiplication is simplified where the multiply, or shift/add is mathematically convenient. For instance, this simplified approach applies where support is needed only for the following horizontal resolutions: 128, 240, 480, 960 or 1024 pixels.

Figure 8:
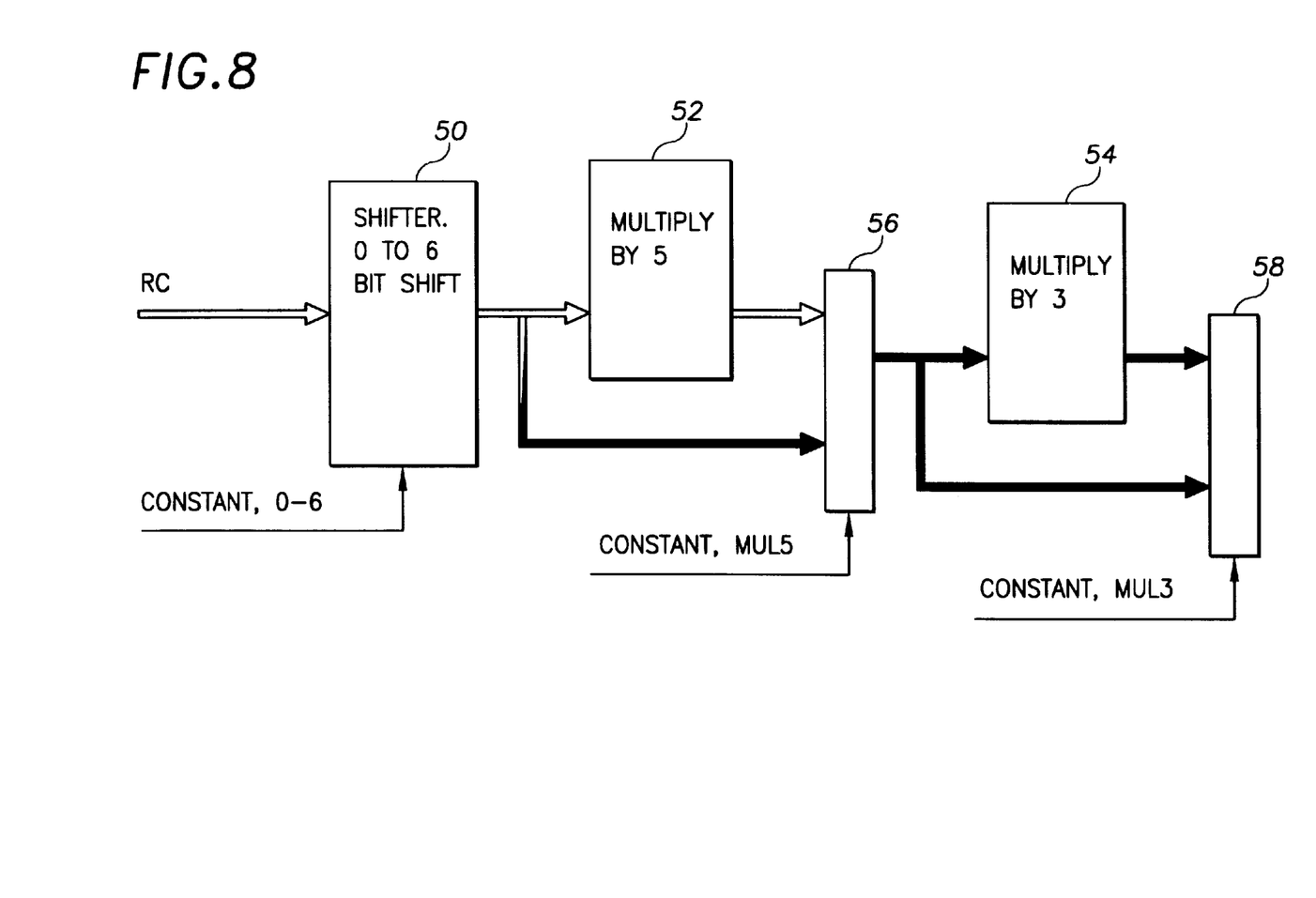
FIG. 8 is a block diagram of a circuit used to implement a multiply function, according to an example embodiment of the present invention, for use in connection with the determination of the address to fetch data for a DCT compression.
Figure 9:
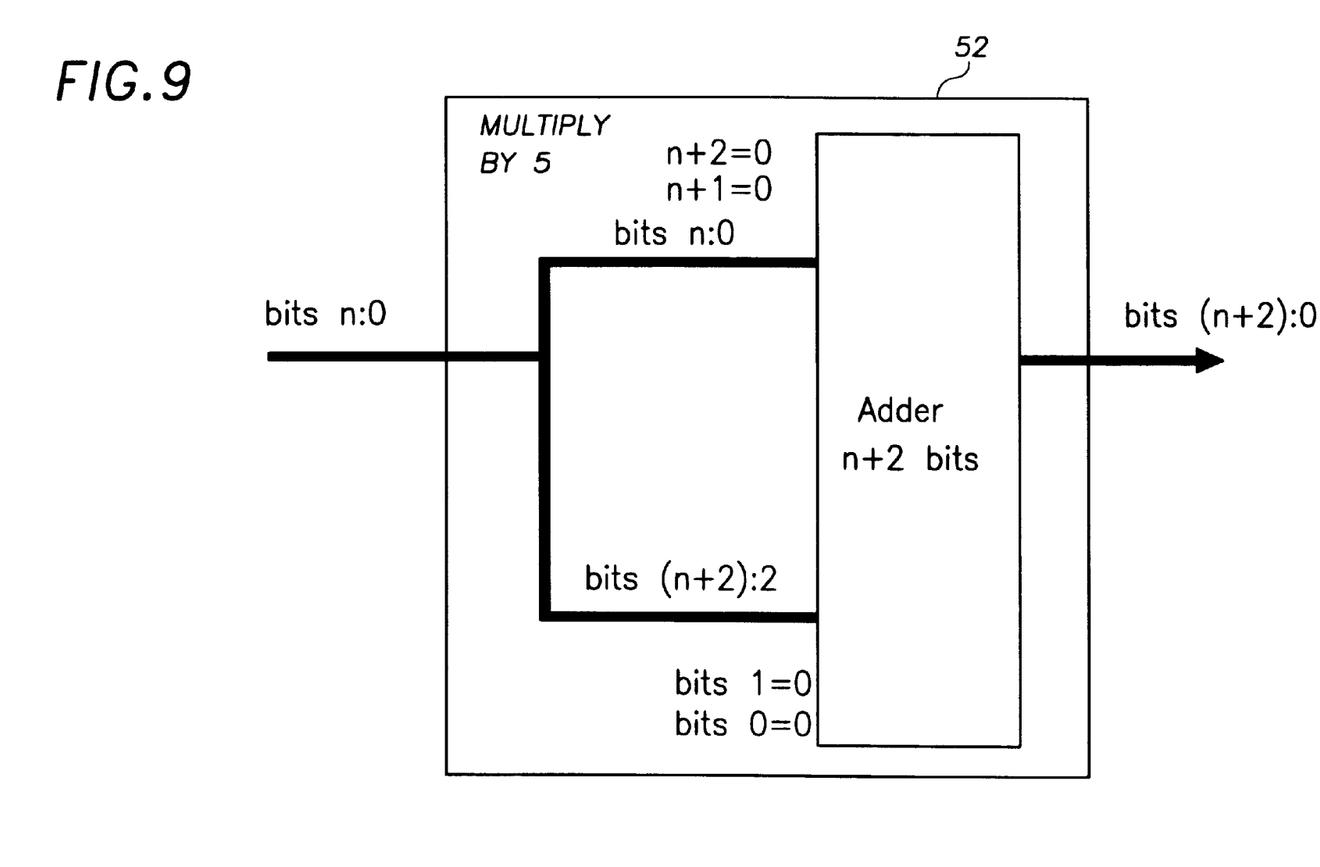
FIG. 9 is a block diagram of an alternative circuit used to implement a multiply function, according to an example embodiment of the present invention, for use in connection with some applications where the size is predetermined.

FIG. 8, for instance, illustrates a circuit used in the multiply of RC times NCol for the NCol as described in the proceeding table. The shifter 50 in FIG. 9 is functionally implemented as a multiplexer having a "constant input" providing a shift of up to 6 bits, thereby providing the mathematical operation to generate a number having a value up to $2^6$ greater than the input number represented by RC.

The multiply by three and multiply by five blocks 52 and 54, respectively, are similarly implemented. For instance, to multiply by five, the input to the block 52 would be shifted to the left twice and the result is added to the input. FIG. 9 illustrates such a shift/add circuit for implementing the multiply by five block 52 of FIG. 8. Blocks 56 and 58 of FIG. 8 are multiplexers, each with a lower input indicating whether to pass the output of the previous multiply block or to pass its input (a "constant").

The following table illustrates where these common horizontal resolutions can be supported for the example circuit of FIG. 8 with a series of shifts and several adds.

| Horizontal Pixels | Horizontal Tiles | Binary Shift | Multiply by 5? | Multiply by 3? |
| --- | --- | --- | --- | --- |
| 128 | 8 | 3 | No | No |
| 240 | 15 | 0 | Yes | Yes |
| 480 | 30 | 1 | Yes | Yes |
| 960 | 60 | 2 | Yes | Yes |
| 1024 | 64 | 6 | No | No |
| 640 | 40 | 3 | Yes | No |

In the above table, the entries in the first, second and third columns correspond to the lower inputs of each of blocks 50, 56 and 58, respectively. The entry in the first column indicates the number of binary shifts for block 50. The entry in the second column indicates if the multiplexer block 56 should pass the output of the multiply by five block, and the entry in the third column indicates if the multiplexer block 58 should pass the output of the multiply by three block.

In some applications the size of the tile array is known beforehand, as is typically the case for digital cameras and devices with fixed image capture inputs; in these applications, the skilled artisan will recognize that the NCol multiply function can be reduced further.

Figure 10A:
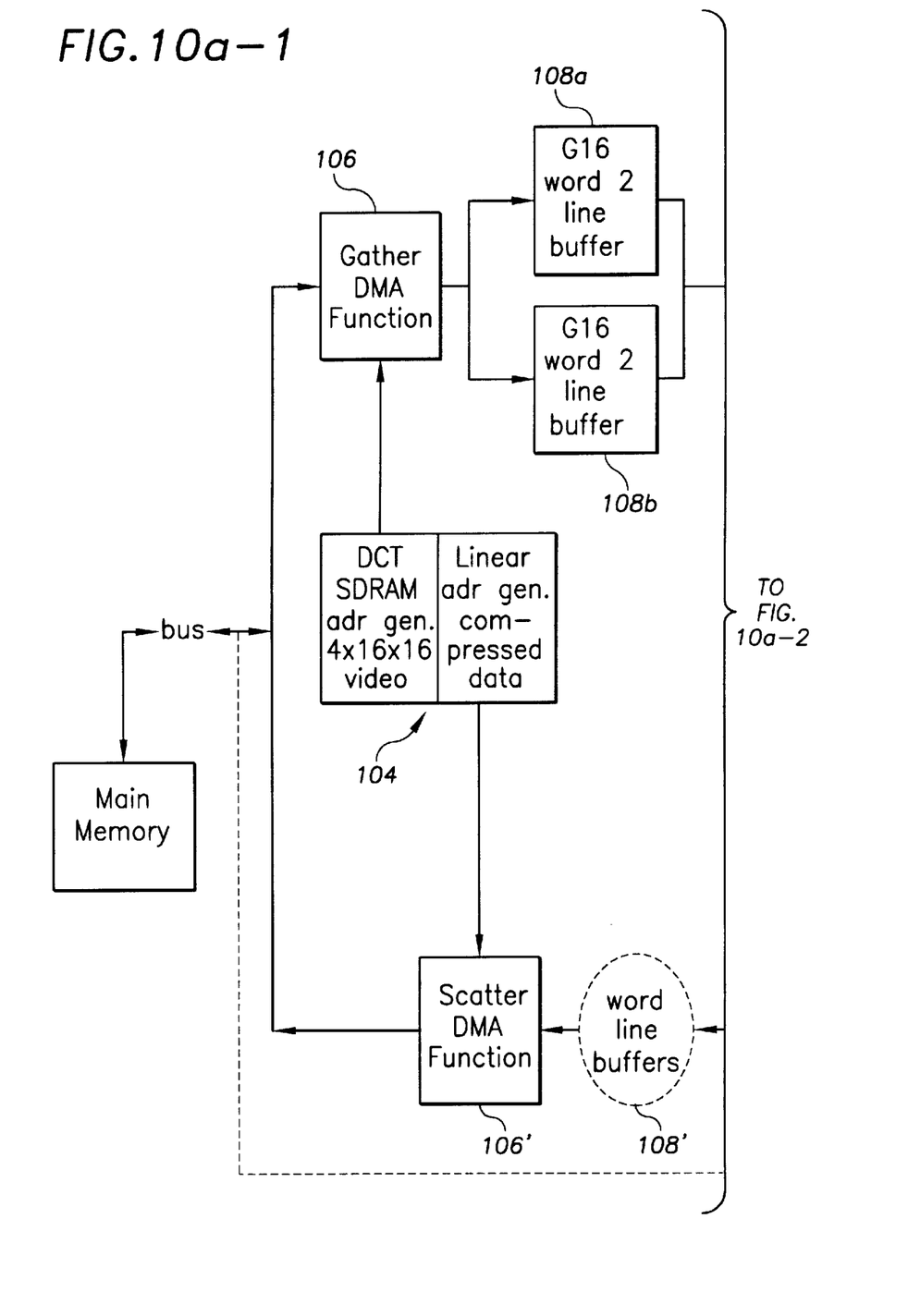
Figure 10A:
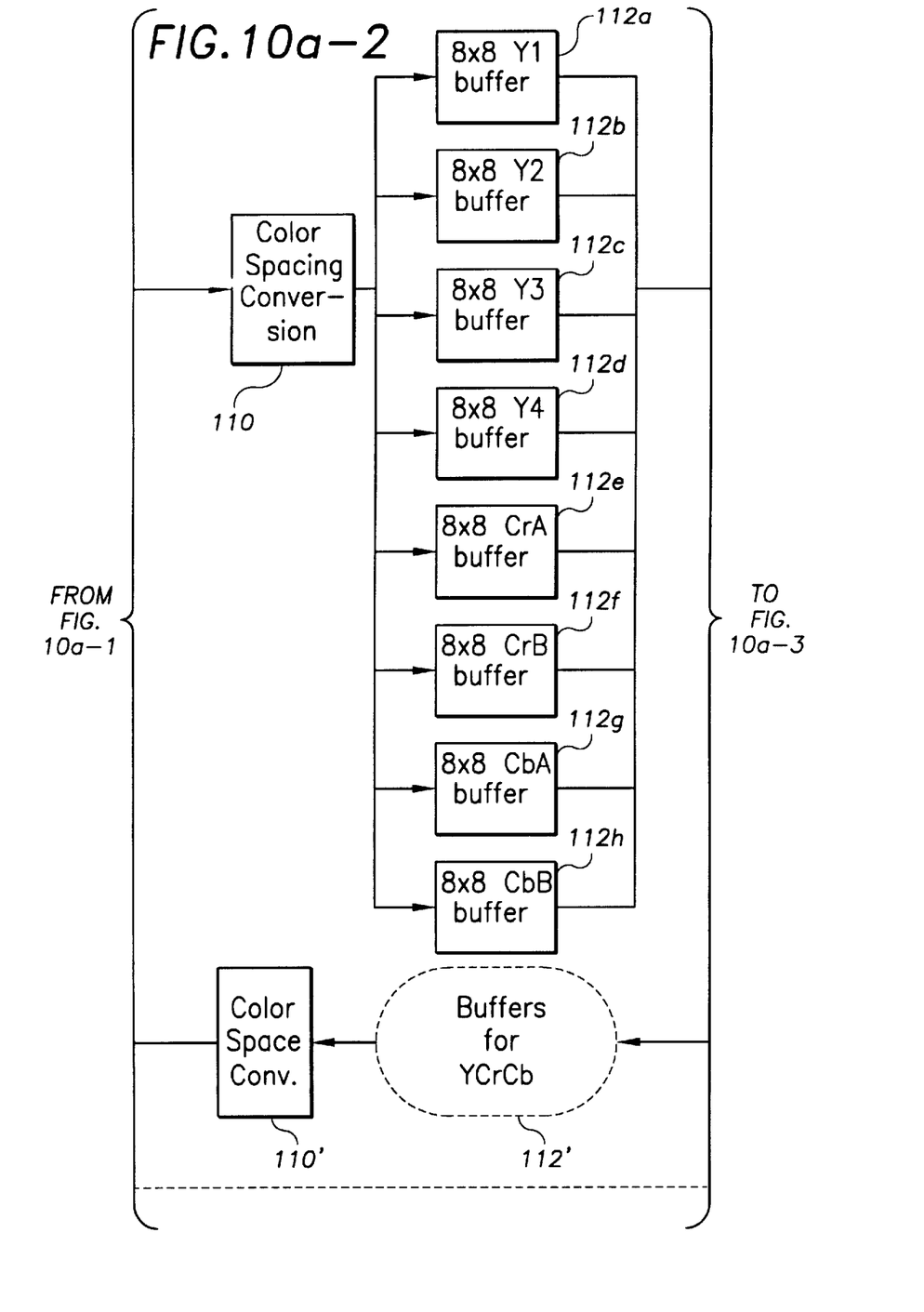
Figure 10A:
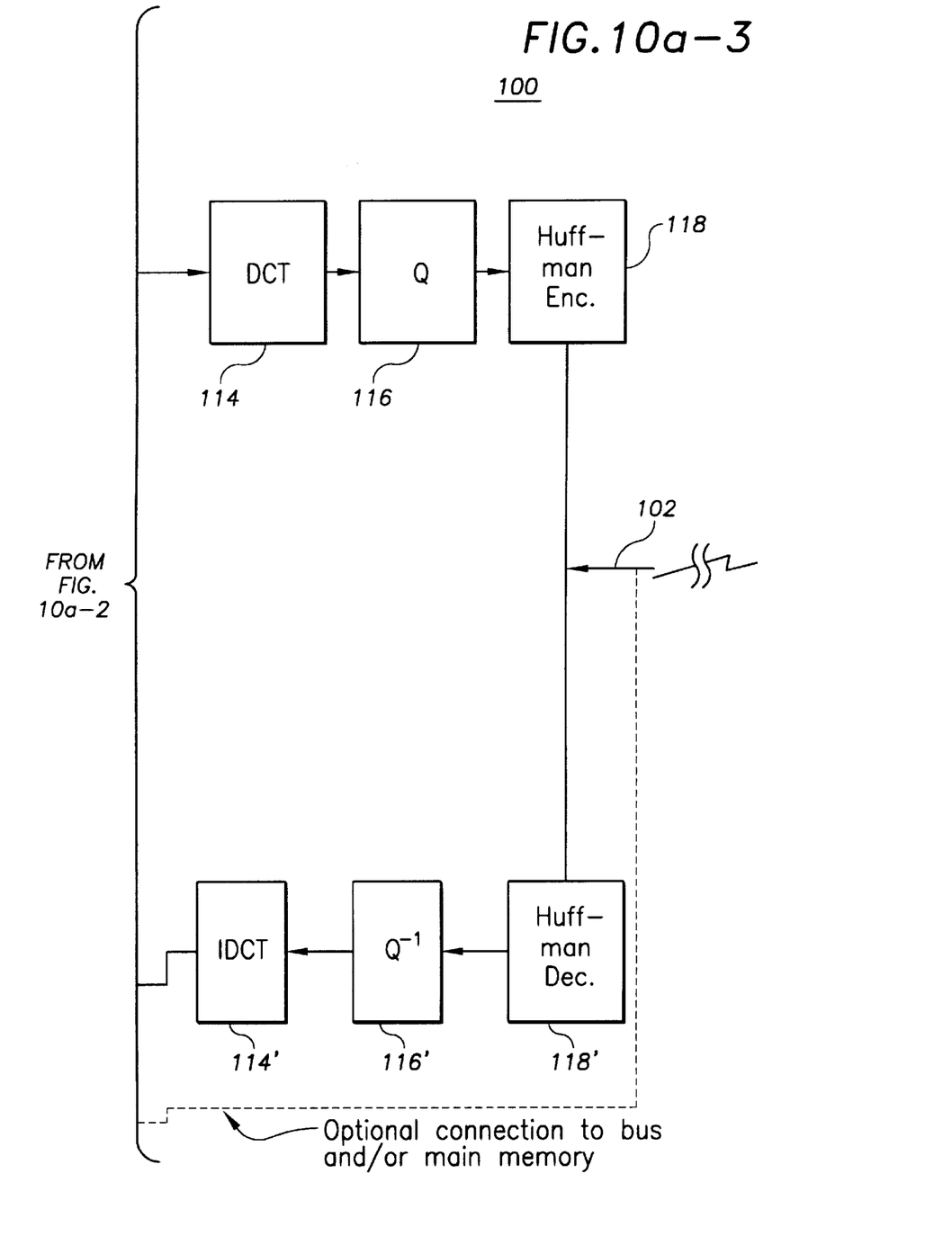

FIG. 10a illustrates another example circuit 100 for efficiently moving data between a RGB color space and a YCrCb color space memory. The upper portion of FIG. 10a illustrates the previously described data flow from an RGB space through the YCrCb conversion for presentation to as DCT blocks to a DCT computation engine for data compression and transmission through a channel 102, which is typically adapted to feed a high-speed driver (not shown) communicatively coupled to a remote terminal. The lower portion of FIG. 10a illustrates the inverse data flow, in compressed form through the channel 102, to an inverse DCT ("IDCT") computation engine for decompression into DCT blocks (YCrCb color space) for conversion to an RGB space.

More specifically, circuit of FIG. 10a includes a DCT SDRAM address generator 104 which is adapted to fetch data from the RGB color space memory (not shown) for compression and to store data in the RGB color space memory after decompression. At block 106, the fetched RGB data gathered and distributed, e.g., by a DMAC, to word line buffers 108a for presentation to block 110 which computes the color space conversion values for their presentation to the four Y buffers 112a–112d and the pairs of CrA and CrB buffers 112e–112h. As these buffers 112a–h are filled, they are accessed as DCT blocks for compression by the DCT block 114, the quantizer 116 and the Huffman decoder 118. In many applications, a data multiplexer (not shown) is used to present the video data along with data from other parallel sources for transmission via the channel 102.

The data-processing path from the channel 102 to the RGB color space memory follows inversely from the above discussion, and FIG. 10a denotes the corresponding blocks (e.g., block 110 corresponds to block 110'). Where the compression/decompression functions are processor-implemented, for example, using a specialized or dedicated DSP, many applications share these hardware resources.

Figure 10B:
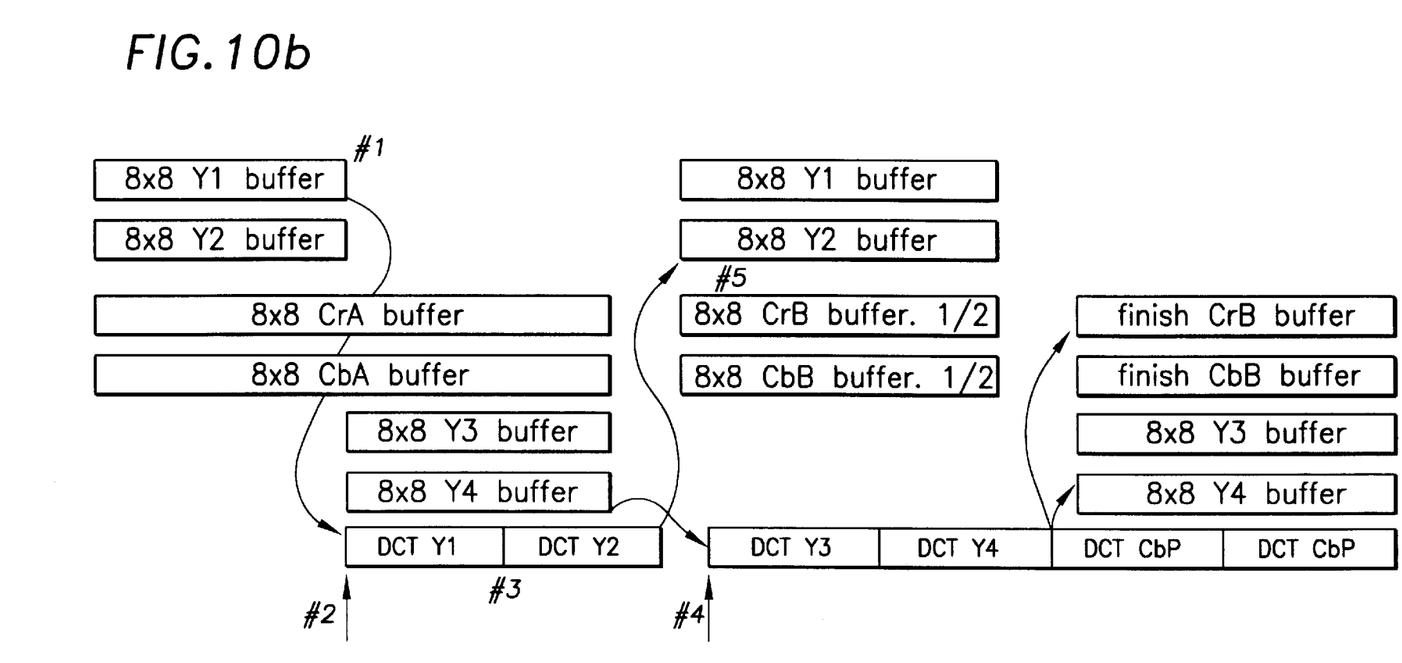

FIG. 10b shows the DCT blocks as they are filled and available for the DCT functional block. The Y1, Y2 and CrA, CrB buffers are filling at the same time. However, the Y1 and Y2 blocks are completed prior to the CrA and CbA because this data is subsampled. The Y1 and Y2 blocks can be sent to the DCT block as soon as they are complete. This is shown above as #1. At #2, the second set of Y buffers, Y3 and Y4, can begin to fill and the process of fetching the CbA and CbB buffers continues. At #2 the processing of the two Y buffers, Y1 and Y2 can begin. It is assumed that a single DCT block is available and the Y1 is processed followed by the Y2. When the Y3 and Y4 buffers are complete and the DCT block is available, the DCT conversions can continue with the Y3 block, #4 above. Also, when the Y2 buffer is free, the memory fetch can start again, #5, as a extra set of Cr buffers, CrB and CbB are available. Depending upon the speed of the memory subsystem and the speed of the DCT block, #4 and #5 can occur in any order. A DCT for a single 16×16 block generates 4 Y blocks, 1 Cr block, and 1 Cb block. This circuit, however, has 4 Y buffers, 2 Cr buffers, and 2 Cb buffers. This asymmetry is intentional, as the Y data is available as two groups of two each, allowing pipelining, and the Cr and Cb data is not available until the completion of the entire 16×16 block.

The various embodiments described above are provided by way of illustration only and are not intended to limit the invention. Those skilled in the art will readily recognize various modifications and changes that may be made to the present invention without strictly following the example embodiments and applications illustrated and described herein. For example, use of either a JPEG format or data compression/decompression is not necessarily required, as other applications may benefit from conversion between an RGB color space and and a YCrCb color space using the present invention, the scope of which is set forth in the following claims.

What is claimed is:

1. A method for transferring data between an RGB color space memory and a YCrCb color space memory useful for presentation to a DCT block-computation engine, the method comprising:

providing the data in the RGB color space memory with an RGB display screen area as a tile array having C columns and R rows of tiles, where one tile corresponds to sufficient RGB data for a DCT of at least one of a Cr data array and a Cb data array;

fetching data at addresses in the tile array by accessing the data one tile at a time, tracking both the row within each tile and the tile within the tile array, the addresses being a function of C, the tracked row and a tacked tile within the tile array; and while the data is being fetched, using the fetched data to fill buffers for the Y, Cr and Cb data arrays corresponding to the RGB display screen area; and computing one of the addresses as a action of: the number of tiles in the array multiplied by TN, plus a count of the tracked row multiplied by a count of C multiplied by a constant, where TN corresponds to the tracked tile number within the tile array.

2. The method of claim 1, wherein the one tile corresponds to RGB data for a DCT of a Cr data array, a Cb data array, and four Y data arrays.

3. A circuit arrangement for transferring data between an RGB color space memory and a YCrCb color space memory useful for presentation to a DCT block-computation engine, comprising:

a processor arrangement programmed and configured to provide the data in the RGB color space memory with an RGB display screen area as a tile array having C columns and R rows of tiles, where one tile corresponds to sufficient RGB data for a DCT of at least one of a Cr data array and a Cb data array, the processor arrangement being further programmed and configured to transfer data between the color space memories by fetching data from one of the color space memories and storing the fetched data at the other of the color space memories, the data being transferred as a function of C and as a function of accessing one tile at a time and tracking both the row within each tile and the tile within the tile array and to compute one of the addresses as a function of: the number of tiles in the array multiplied by TN, plus a count of the tracked row multiplied by a count of C multiplied by a constant, where TN corresponds to the tracked tile number within the tile array.

4. A circuit arrangement for transferring data between an RGB color space memory and a YCrCb color space memory useful for presentation to a DCT block-computation engine, comprising:

a processor arrangement programmed and configured to provide the data in the RGB color space memory with an RGB display screen area as a tile array having C columns and R rows of tiles, where one tile corresponds to sufficient RGB data for a DCT of at least one of a Cr data array and a Cb data array, the processor arrangement being further programmed and configured to fetch data at addresses in the tile array by accessing the data one tile at a time, tracking both the row within each tile and the tile within the tile array, the addresses being a function of C, the tracked row and a tracked tile within the tile away, and while the data is being fetched, to use the fetched data to fill buffers for the Y, Cr and Cb data arrays corresponding to the RGB display screen area and being further programmed and configured to compute one of the addresses as a function of: the number of tiles in the array multiplied by TN, plus a count of the tracked row multiplied by a count of C multiplied by a constant, where TN corresponds to the tracked tile number within the tile array.

5. The circuit arrangement of claim 4, wherein the processor arrangement is further programed and configured to compute said one of the addresses as a function of a count within a word segment of a tile.

6. A circuit arrangement for transferring data between an RGB color space memory and a YCrCb color space memory useful for presentation to a DCT block-computation engine, comprising:

a processor arrangement programmed and configured to provide the RGB color space memory with an RGB display screen area as a tile array having C columns and R rows of tiles, where one tile corresponds to sufficient RGB data for a DCT of at least one of a Cr data array and a Cb data array, the processor arrangement being further programmed and configured to fetch data in the YCrCb color space memory, and, while the data is being fetched, to write the fetched data to the tile array by addressing one tile at a time, the addresses determined as a function of C and a function of tracking both the row within each tile and the tile within the tile array and being further programmed and configured to compute one of the addresses as a function of: the number of tiles in the array multiplied by TN, plus a count of the tracked row multiplied by a count of C multiplied by a constant, where TN corresponds to the tracked tile number within the tile array.

7. The circuit arrangement of claim 6, wherein the processor arrangement is further programmed and configured to compute said one of the addresses as a function of a count within a word segment of a tile.

* * * * *